United States Patent [19]

Galimi et al.

[11] 4,255,263

[45] Mar. 10, 1981

[54] STACKED ASSEMBLY FOR REVERSE OSMOSIS

[75] Inventors: Giuseppe Galimi, Turin; Mario Montalto, Grugliasco; Luciano Pluchino, Turin, all of Italy

[73] Assignee: Costruzioni e Impianti S.p.A. Fiat Engineering, Turin, Italy

[21] Appl. No.: 58,596

[22] Filed: Jul. 18, 1979

[30] Foreign Application Priority Data

Aug. 10, 1978 [IT] Italy .............................. 68888 A/78

[51] Int. Cl.³ .......................................... B01D 31/00
[52] U.S. Cl. ................................ 210/321.1; 210/433.2
[58] Field of Search ........... 210/321 R, 321 A, 321 B, 210/433 M, 493 M, 22, 23 R, 23 F, 23 H, 224, 231, 461, 486, 487; 55/16, 158; 422/48

[56] References Cited

U.S. PATENT DOCUMENTS

| | | | |
|---|---|---|---|
| 2,664,395 | 12/1953 | Marchand | 210/321 A |
| 3,534,860 | 10/1970 | Dibelius et al. | 210/321 B |
| 3,560,377 | 2/1971 | Loeffler | 210/321 R |
| 3,734,298 | 5/1973 | Riede et al. | 210/321 B |
| 4,165,082 | 8/1979 | Foucras et al. | 210/321 R |

Primary Examiner—Charles N. Hart
Assistant Examiner—David R. Sadowski
Attorney, Agent, or Firm—Sughrue, Rothwell, Mion, Zinn and Macpeak

[57] ABSTRACT

The stack assembly (FIG. 9) is formed by identical plates (P) of rectangular shape alternating with semipermeable membranes (12). A face of each plate is formed with a plurality of transversely extending flow-conveying beds, each of which has a through-aperture at each of its opposite ends. The membrane is affixed to the other face of the plate by means of plug members to provide a modular unit, some of the plug members in the stack assembly being "open" (13a) and the other being "blind" (13b). Hydraulic connections in "series", in "parallel" and in "series/parallel" are obtainable by properly distributing the open and blind plug members.

5 Claims, 9 Drawing Figures

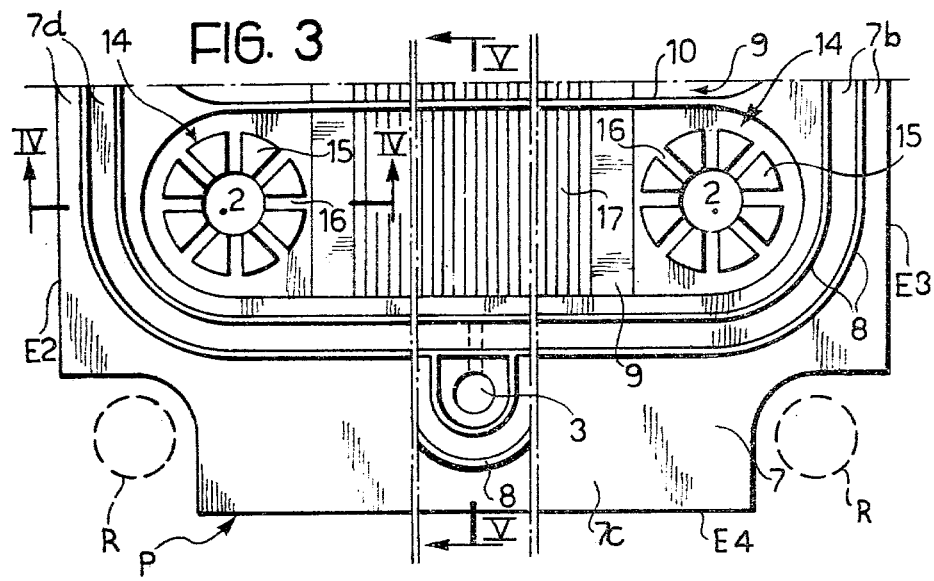
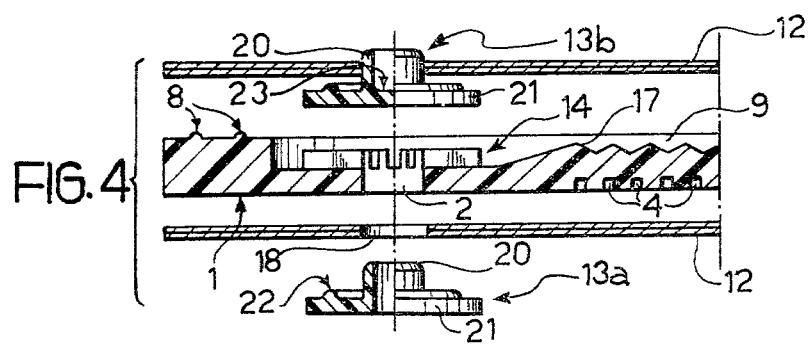
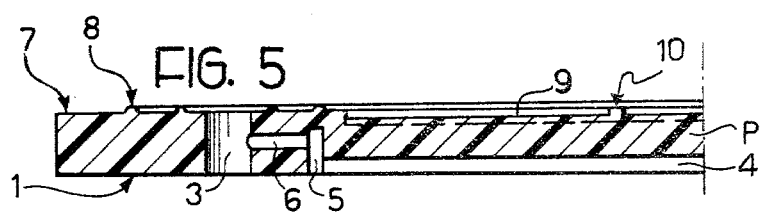
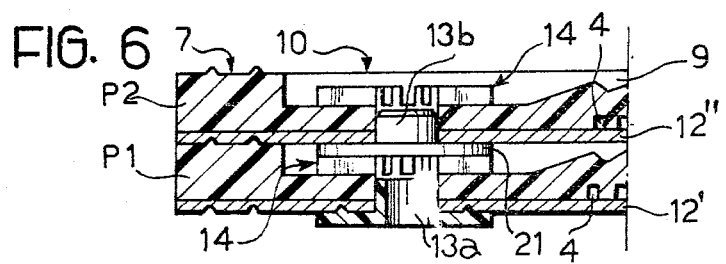

STACKED ASSEMBLY FOR REVERSE OSMOSIS

This invention relates to a stacked assembly for reverse osmosis comprising a plurality of semipermeable membranes superposed on rigid support plates.

In a known assembly of this type the support plates and membranes are in the form of centrally apertured disks fitted on a central shaft between a pair of clamping heads, and a porous layer is interposed between every second pair of consecutive membranes. The liquid being handled flows radially outwardly on one face of a support disk and radially inwardly on the opposite face of the disk, the permeate being collected and evacuated by the said porous layer. To allow the abovementioned flow of liquid two series of different, mutually alternating support disks are necessary, so that the structure is costly and much attention shall be paid on assembly of the various components. Also, from hydraulic point of view, the connection is "in series" with no possibility of obtaining connections in "parallel" or in "series/parallel", so that the adaptability of the assembly to various practical conditions is poor.

This invention provides a stacked assembly for reverse osmosis comprising a plurality of semipermeable membranes superposed on rigid support plates, characterized in that:

(a) the support plates are of a flat generally rectangular shape and are identical with each other, while a semipermeable membrane is interposed between each pair of consecutive plates in the assembly;

(b) each plate comprises a receiving face and a delivery face, the receiving face being planar and formed in a centrally located region thereof with an array of intercommunicating grooves, whereas the delivery face comprises: a planar abutment region extending along the whole contour of the face for sealing engagement with the respective membrane, a plurality of elongate, shallow flow-conveying beds formed in a centrally located region of the delivery face surrounded by said abutment region, said beds being parallel to a pair of opposite edges of the plate and having each its opposite end portions extending beyond the said centrally located region of the receiving face;

(c) the bottom of each of the end portions of each bed is formed with an inlet through-aperture and with a flat bossage which surrounds the mouth of the aperture and is formed by a plurality of sectors defining radial passages therebetween, the height of said bossage being less than the depth of the respective end portion of the bed;

(d) at least one outlet through-aperture is formed in each plate within the area of said planar abutment region, this aperture being in communication with the said array of grooves in the receiving face of the plate;

(e) each of the membranes is formed with apertures matching the said inlet- and outlet through-apertures in the plates; and (f) each of the membranes is sealingly clamped to the receiving face of a respective plate both by the abutment region of the delivery face of the adjacent plate and by means of a plurality of mutually interchangeable plug members having each a shank portion which is forcibly engaged in the corresponding inlet through-aperture through the matching aperture in the membrane and protrudes axially from a disk portion integral with the shank, said disk portion being backed-up by the bossage sectors of the said adjacent plate thereby to clamp the membrane, the shanks of some of said plug members being axially open to allow passage of liquid therethrough while the shanks of the remaining plug members being blind to prevent passage of liquid through the through-apertures in which they are engaged.

Thus, in the stacked assembly according to the invention the support plates are identical with each other, so that production costs are drastically cut down. The plug members are cheaply obtainable by injection moulding in large series (similarly to stoppers for bottles, for example), preferably from polyethylene or polypropylene. The flexibility of the assembly is extraordinarily high because, as will be better seen hereinafter, "series", "parallel" and "series/parallel" connections of plates or groups of plates are easily obtainable by properly distributing the blind plug members and the open plug members.

Preferably, according to the invention, the distribution of the through-passages is symmetrical with respect to at least one of the two axes of symmetry passing through the centers of the opposite edges of the plates, whereby a proper orientation of the plates in the stack is very easy to obtain. Also, each plate may be pre-assembled with its corresponding membrane by affixing the latter to the plate by means of the plug members to provide a modular unit, and a number of modular units may easily be stacked to provide a desired stacked assembly.

Still preferably the inlet through-apertures in each plate are aligned in two rows parallel both therebetween and to the respective opposite edges of the plate. At the same time, preferably, each plate comprises two outlet through-apertures located adjacent the other respective opposite edges of the plate.

According to an advantageous embodiment, the plates are moulded of a rigid polycarbonate synthetic resin or ABS terpolymer and the plug members are moulded of polyethylene. In this manner, owing to the resilience of polyethylene, the shanks of the plug members may efficiently be forcibly engaged in the respective inlet through-apertures and, at the same time, the membrane-clamping efficiency of the disk portions of the plug members is very high.

Further details and characteristic features of the invention will result from the following description made with reference to the accompanying drawings showing an advantageous embodiment of the invention.

In the drawings:

FIG. 3 is a fragmentary detail view of the delivery face of FIG. 2;

FIG. 4 is a cross-sectional view on line IV—IV of FIG. 3, additionally showing a pair of membranes and plug members adjacent the involved plate;

FIG. 5 is a cross-sectional view on line V—V of FIG. 3;

FIG. 6 is a view similar to FIG. 4, showing two consecutive plates, membranes and plug members in clamped condition of the stack assembly;

Referring to FIGS. 1-6, a plane plate P is shown of square shape having its four corner zones recessed so that a stack of identical plates can be clamped between a pair of square-shaped clamping heads by means of four tie rods R. The receiving face 1 (FIG. 1) of the plate is smooth and planar, with the exception of a centrally located square region 1A which has formed therein an array of rectilinear grooves 4 parallel both therebetween and to the opposite edges E1, E2 of the plate. In a practical embodiment, the size of the plate may be 26×26 cm, the size of the square region 1A may be 14×14 cm, and the plate may be about 5 mm thick. The width of the grooves 4 may be from 0.3 to 0.5 mm and their mutual spacing may be about 2.5 mm. All grooves 4 open at their opposite ends into a pair of transverse collecting grooves 5 parallel to the respective edges E3, E4 of the plate, of a depth of about 3 mm.

Figure 1:
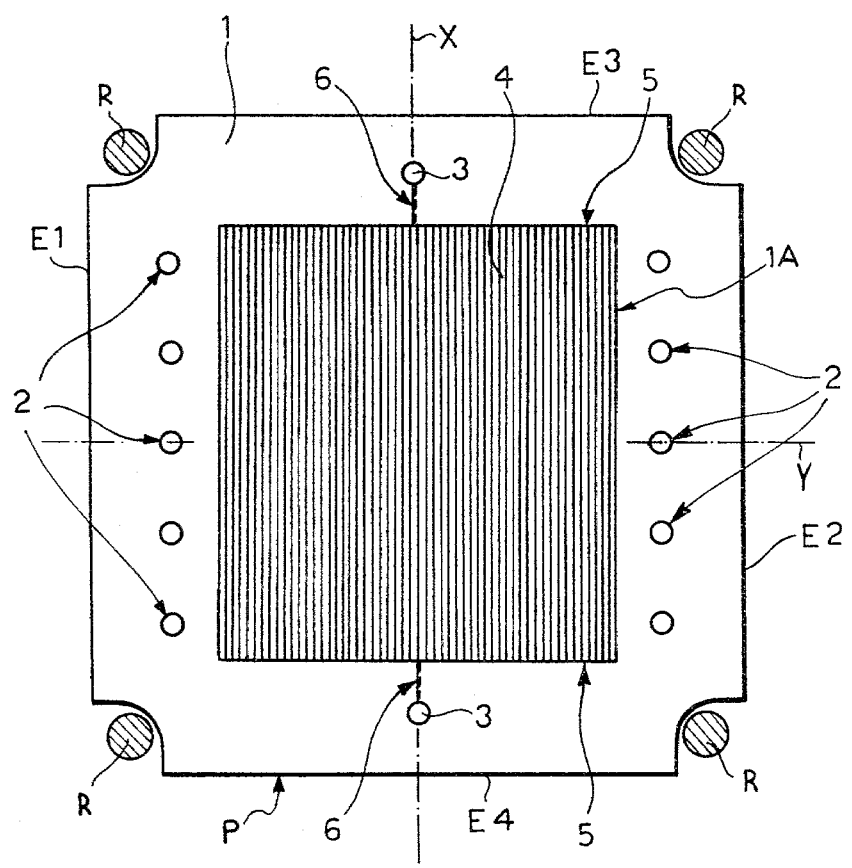
FIG. 1 is a schematic plan view of the receiving face of a plate.

X and Y are the two main axis of symmetry of the plate. A channel 6, formed within the thickness of the plate, extends along the axis X from each respective collecting groove 5 and opens into a cylindrical outlet through-aperture 3, the latter being located about midway between its associated groove 5 and the respective edge E3, E4. FIG. 1 also shows cylindrical inlet through-apertures 2 distributed in two rows (five per row) symmetrically with respect to the axis X and Y. The two rows are parallel to the opposite edges E1, E2 and are located outside of the grooved region 1A.

Figure 2:
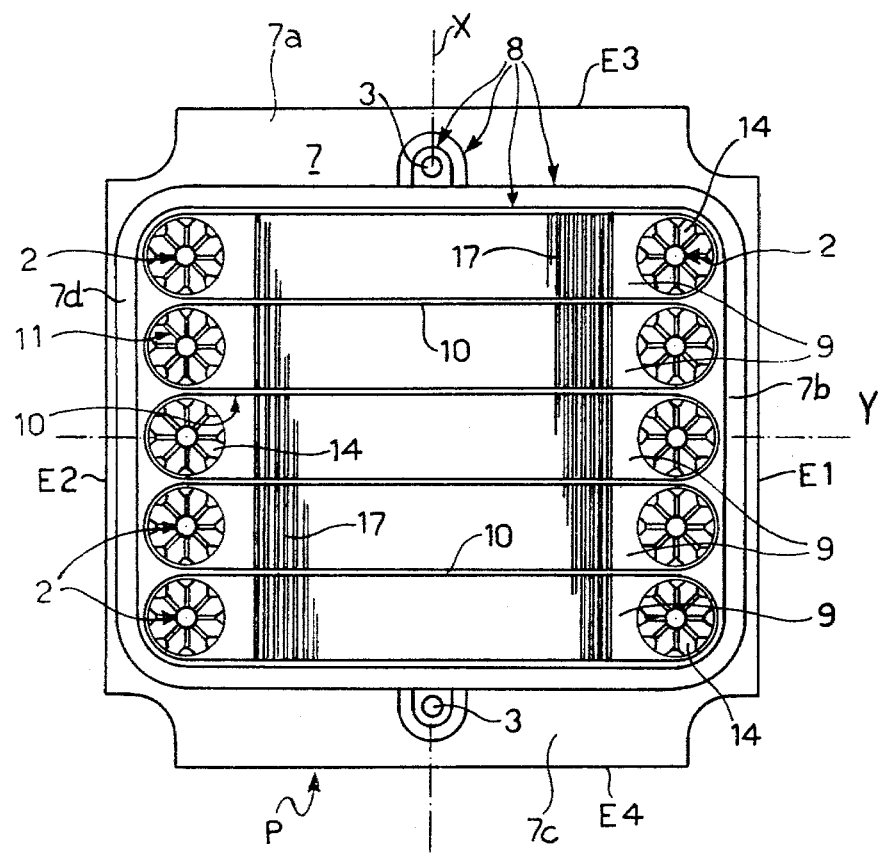
FIG. 2 is a similarly schematic plan view of the delivery face of the plate of FIG. 1.

The delivery face of the plate P is generally denoted by 7 in FIGS. 2 and 3 and is smooth and planar with the exception of seal-improving ribs 8 and five elongate shallow depressions 9 providing the aforesaid flow-conveying beds. The term "shallow" indicates that the depth of each bed 9 is small in comparison with the width of the bed. The beds 9 are identical with each other and each of them is generally rectangular with circularly rounded ends. The beds are all parallel to the edges E3, E4 and arranged symmetrically with respect to the axis X, Y in a centrally located region of the face 7. Consecutive beds are separated from each other by rectilinear webs 10, the upper edges of which are flush with the face 7. The width in the direction of axis X, of the region occupied by the beds, is substantially identical with the width of the grooved region 1A (FIG. 1) in the same direction, that is, about 14 cm. However, in the direction of axis Y, the opposite end portions of each bed protrude beyond the width (in the same direction) of the said grooved region 1A so as to encompass the respective inlet apertures 2. Thus, the central region occupied by the beds 9 is surrounded on the whole contour of the delivery face 7 by smooth coplanar portions of said face denoted by 7a, 7b, 7c and 7d in FIG. 2, providing the aforesaid abutment region for sealing engagement with the respective membrane. The ribs 8 are formed in this region all round the group of beds and also around the outlet apertures 3 to improve the sealing engagement with the membrane.

In each of the beds, the mouth of each inlet aperture 2 is surrounded by a flat circular bossage generally denoted by 14 protruding from the bottom of the respective end portion of the bed, the bossage being formed by a plurality of concentrically arranged sectors 15 defining therebetween radial passages 16 for the liquid being treated. With the data exemplified hereinbefore, the width of each bed may be about 28 mm, the inner diameter of each aperture 2 may be about 8 mm, and the outer diameter of each bossage may be about 19 mm. The depth of each end portion of each bed 9 may be about 3.5 mm and the height of each bossage may be about 2 mm; that is to say, the height of each bossage is less than the said depth, as can be seen in FIGS. 4 and 6. The portion of the bed interconnecting the end portions is less deep (about 1 mm) and the bottom thereof is formed with transverse corrugations 17 to provide (as is known per se) turbulence conditions in operation.

The semipermeable membranes are denoted by 12 in the drawings and are cut out from commercially available sheet stock material to a shape matching the shape of the plates P, which latter are, as aforesaid, all identical. Each membrane also comprises circular apertures such as 18 in FIG. 4, exactly matching the respective inlet and outlet apertures 2, 3 in the plates. On assembly, the membrane is superposed onto the receiving face of its respective plate P and is affixed to the plate by forcibly inserting into each inlet aperture 2 (through the corresponding aperture 18 in the membrane) a plug member which may take two alternative forms denoted by 13 $a$ and 13$b$ in FIGS. 4 and 6-9. In either form the plug member is moulded of polyethylene and comprises a short cylindrical shank 20 axially protruding from a disk 21 integral with the shank. The underside of the disk is preferably formed with a circular rib 22 to improve sealing pressure engagement of the disk with the membrane. In the form 13$a$ the shank of the plug member is axially open (FIG. 4), so that liquid may flow therethrough in operation. In the form 13$b$ the shank 20 is closed by a bottom portion 23, so that the plug member is "blind" and prevents the flow of liquid through the inlet aperture into which it is engaged. Obviously, at least one of the two plug members inserted into the inlet apertures of the same flow-conveying bed 9 is "open". When both plugs are "open", the bed is connected in parallel with its corresponding bed in the next plate and a number of consecutive plates may be connected in this manner to provide the necessary number of parallel flows. When one plug is "open" and the other is "blind", the bed is in "series" connection, as will be better seen hereinafter.

FIG. 6 shows that the thickness of the disk 21 of a plug member substantially corresponds to the difference between the depth of the end portion of a bed and the height of the bossage 14, e.g. 1.5 mm. Thus, when a stack of plates alternating with membranes is clamped between the clamping heads, each of the membranes is sealingly clamped on its entire periphery between the aforesaid abutment region 7a . . . 7d of a plate and the receiving face 1 of the next plate. The membrane is also clamped against said receiving face 1 by the webs 10, which extend transversely of the grooves 4 in said face. Still moreover, since the disk 21 of a plug member abuts on the respective bossage 14, the membrane through which this plug member is inserted is sealingly clamped by the disk all around the respective aperture 2. It will be also seen in FIG. 6 that the height of the shank of the "open" plug member 13$a$ substantially corresponds to the axial length of the aperture 2 (FIG. 4) plus the thickness of the membrane, so that the free end of the shank does not obtrude the radial passage between the sectors of the bossage. FIG. 6 shows two consecutive plates P1, P2 with their respective membranes 12', 12" and with an "open" plug member 13a inserted into an inlet aperture in the plate P1 while the corresponding aperture in plate P2 is closed by a "blind" plug member 13b. Under these conditions the liquid flowing from below the membrane 12' into and through the member 13a is all diverted into the bed 9 in plate P1 into reverse-osmosis contact with the membrane 12" to yield a "permeate" which is received by the grooves 4 in the next plate P2 and flows to the respective outlet apertures 3 in said plate P2 via the collecting grooves 5 and passages 6 (FIGS. 1 and 5). Since the plates in a stack are identical and are identically mounted, the corresponding apertures 3 in all plates are in axial alignment and jointly form a conduit through which the permeate is evacuated in obvious manner via corresponding apertures and connectors in a clamping head of the stack.

Figure 7:
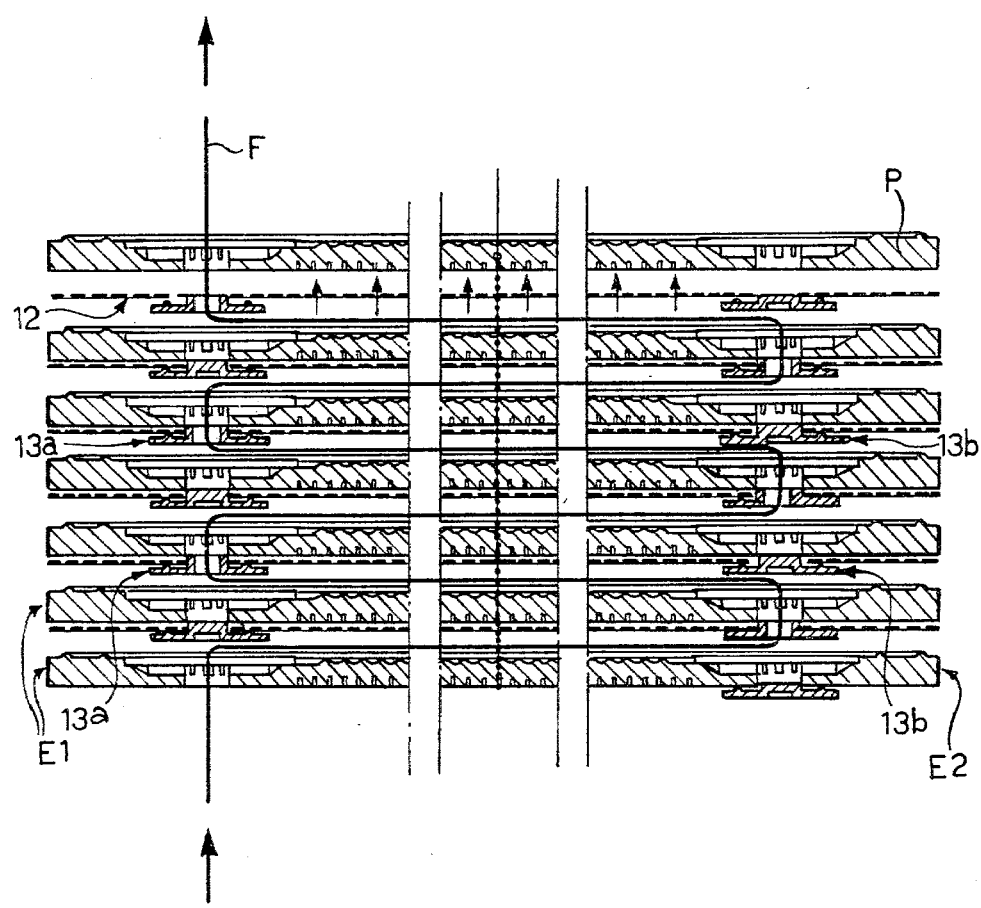
FIG. 7 is an exploded schematic cross-sectional view of the stack assembly wherein the plug members are distributed to provide a "series" connection with respect to the flow of the liquid being processed.
Figure 8:
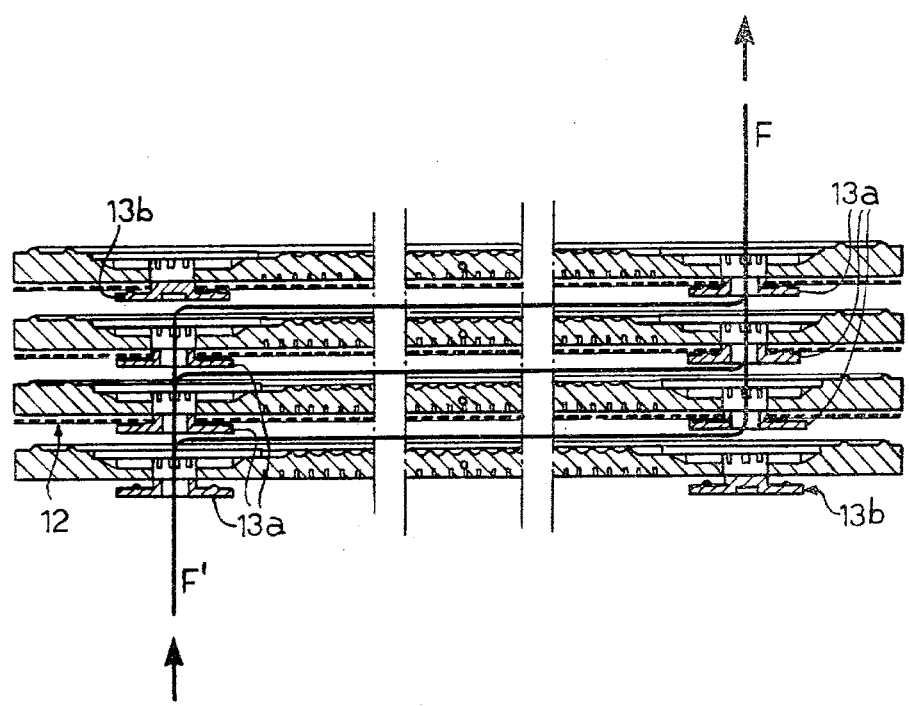
FIG. 8 is a view similar to FIG. 7, wherein the plug members are distributed to provide a "parallel" connection.
Figure 9:
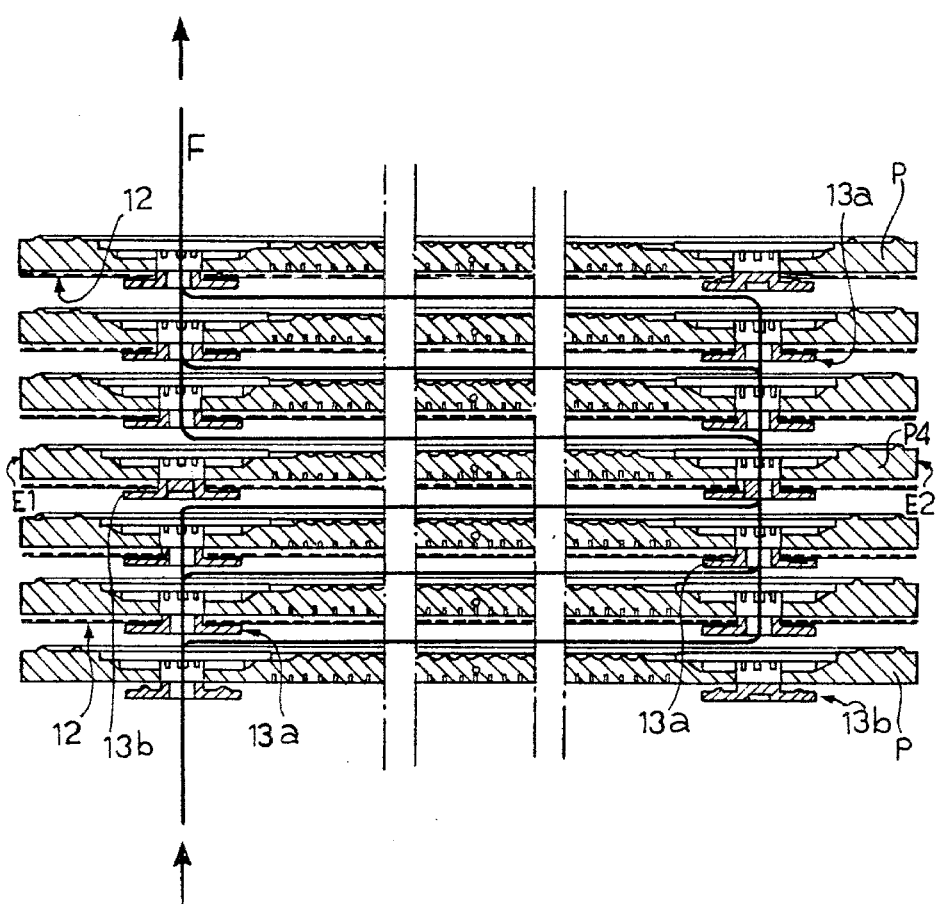
FIG. 9 is a view similar to FIGS. 7 and 8, wherein the plug members are distributed to provide a "series/parallel" connection.

In FIGS. 7–9 the plates and membranes in the stack assembly are illustrated in a slightly exploded view in order to show the flow of the liquid being processed, denoted by a heavy line F.

In FIG. 7 the "open" and "blind" plug members 13a, 13b are distributed alternately, so that each plate has its flow conveying beds connected in series with the corresponding beds in the next plate and the liquid flow is "zig-zagging" in all beds first towards the edge E2 of one plate, than towards the opposite edge E1 in the next plate, and so on.

In FIG. 8, the incoming flow F' has three "open" plug members 13a in front of it, the fourth member 13b being "blind". So, the flow splits into three parallel flows between the plates and the individual flows join each other at the other ends of the flow conveying beds through "open" plug members 13a placed at said other ends.

In FIG. 9, the three lowermost plates and the three uppermost plates work in "parallel" conditions in accordance with the principle shown in FIG. 8. The intermediate plate P4 has the inlet apertures along its edge E1 closed by "blind" plug members 13b, while its inlet apertures along the edge E2 are fitted with "open" plug members 13a. Thus, the plate P4 establishes a "series" connection between the group of its underlying plates and the group of its overlying plates, and, if desired, the "series" connection of the two "parallel" connected groups may be extended by adopting, in lieu of a single plate P4 with its membrane, a "series" group similar to that shown in FIG. 7.

The flow conveying beds 9 (FIG. 3) in each plate must not necessarily be separated from each other by the webs 10. However, in absence of said webs, the overlying membrane may be subjected to undesirable "fluttering" due to the turbulence produced in the liquid by the corrugations 17. Since the webs 10 press the membrane against the next plate, the risk of fluttering is avoided.

The term "rectangular" as used herein to define the shape of the plates shall be construed as including also "square" shapes.

We claim:

1. A stacked assembly for reverse osmosis comprising a plurality of semipermeable membranes superposed on rigid support plates, wherein:
   (a) the support plates are of a flat generally rectangular shape and are identical with each other, while only a single semipermeable membrane is interposed between each pair of consecutive plates in the assembly;
   (b) each plate comprises a receiving face and a delivery face, the receiving face being planar and formed in a centrally located region thereof with an array of intercommunicating grooves, whereas the delivery face comprises: a planar abutment region extending along the whole contour of the face for sealing engagement with the respective membrane, a plurality of elongate, shallow flow-conveying beds formed in a centrally located region of the delivery face surrounded by said abutment region, said beds being parallel to a pair of opposite edges of the plate and having each its opposite end portions extending beyond the said centrally located region of the receiving face;
   (c) the bottom of each of the end portions of each bed is formed with a first through-aperture and with a flat bossage which surrounds the mouth of the aperture and is formed by a plurality of sectors defining radial passages therebetween, the height of said bossage being less than the depth of the respective end portion of the bed;
   (d) at least one second through-aperture is formed in each plate within the area of said planar abutment region, this aperture being in communication with the said array of grooves in the receiving face of the plate;
   (e) each of the membranes is formed with apertures matching the said first and second through-apertures in the plates; and
   (f) each of the membranes is sealingly clamped to the receiving face of a respective plate both by the abutment region of the delivery face of the adjacent plate and by means of a plurality of mutually interchangeable plug members having each a shank portion which is forcibly engaged in the corresponding first through-apertures through the matching apertures in the membrane and protrudes axially from a disk portion integral with the shank, said disk portion being backed-up by the bossage sectors of the said adjacent plate thereby to clamp the membrane, the shanks of some of said plug members being axially open to allow passage of liquid therethrough while the shanks of the remaining plug members being blind to prevent passage of liquid through-apertures in which they are engaged to define first flow path means for a fluid between each membrane and the delivery face of the adjacent plate, said second through-apertures being in communication with each other and the grooves of each receiving face to define second flow path means for receiving only that portion of said fluid which passes through said membranes.

2. A stacked assembly according to claim 1, wherein the distribution of the through-apertures in each plate is symmetrical with respect to at least one of the two axes of symmetry passing through the centers of the opposite edges of the plate.

3. A stacked assembly according to claim 2, wherein the first through-apertures in each plate are aligned in two rows parallel both therebetween and to the respective opposite edges of the plate.

4. A stacked assembly according to claim 3, wherein each plate comprises two second through-apertures located adjacent to the other respective opposite edges of the plate.

5. A stacked assembly according to claim 1, wherein the plates are molded of a rigid polycarbonate synthetic resin or ABS terpolymer and the plug members are molded of polyethylene.

* * * * *